United States Patent [19]

Bazarov et al.

[11] 4,317,057
[45] Feb. 23, 1982

[54] CHANNEL OF SERIES-TYPE MAGNETOHYDRODYNAMIC GENERATOR

[76] Inventors: Georgy P. Bazarov, ulitsa Komarova 12, kv. 20, Voronezh; Valentin I. Kovbasjuk, ulitsa Vavilova, 70, korpus 2, kv. 114, Moscow; Emma N. Kufa, ulitsa Elektrosignalnaya, 12, kv. 14, Voronezh; Stanislav A. Medin, Leningradsky prospekt, 78, korpus 5, kv. 83, Moscow, all of U.S.S.R.

[21] Appl. No.: 159,815

[22] Filed: Jun. 16, 1980

[51] Int. Cl.$^3$ ............................................... H02N 4/02
[52] U.S. Cl. ..................................................... 310/11
[58] Field of Search ......................................... 310/11

[56] References Cited

U.S. PATENT DOCUMENTS

| | | | |
|---|---|---|---|
| 3,792,340 | 2/1974 | Sheinkman et al. | 310/11 |
| 3,940,639 | 2/1976 | Enos et al. | 310/11 |
| 3,940,640 | 2/1976 | Petty et al. | 310/11 |

*Primary Examiner*—Donovan F. Duggan
*Attorney, Agent, or Firm*—Lilling & Greenspan

[57] ABSTRACT

A channel of a series-type magnetohydrodynamic generator comprises a central section with sectionalized electrodes, the ends of the central section adjoining respective transition sections including sectionalized electrodes. Adjacent the free end of each transition section is an end section made as a continuous load electrode. There is a switching element between each pair of the electrodes of the transition sections and between the "outermost electrode of the transition section—load electrode". Connected in parallel with the switching elements are relay and a respective type limit voltage switching elements. Sensitive elements of the same type are inserted between the outermost adjoining sectionalized electrodes of the central and the transition sections.

2 Claims, 7 Drawing Figures

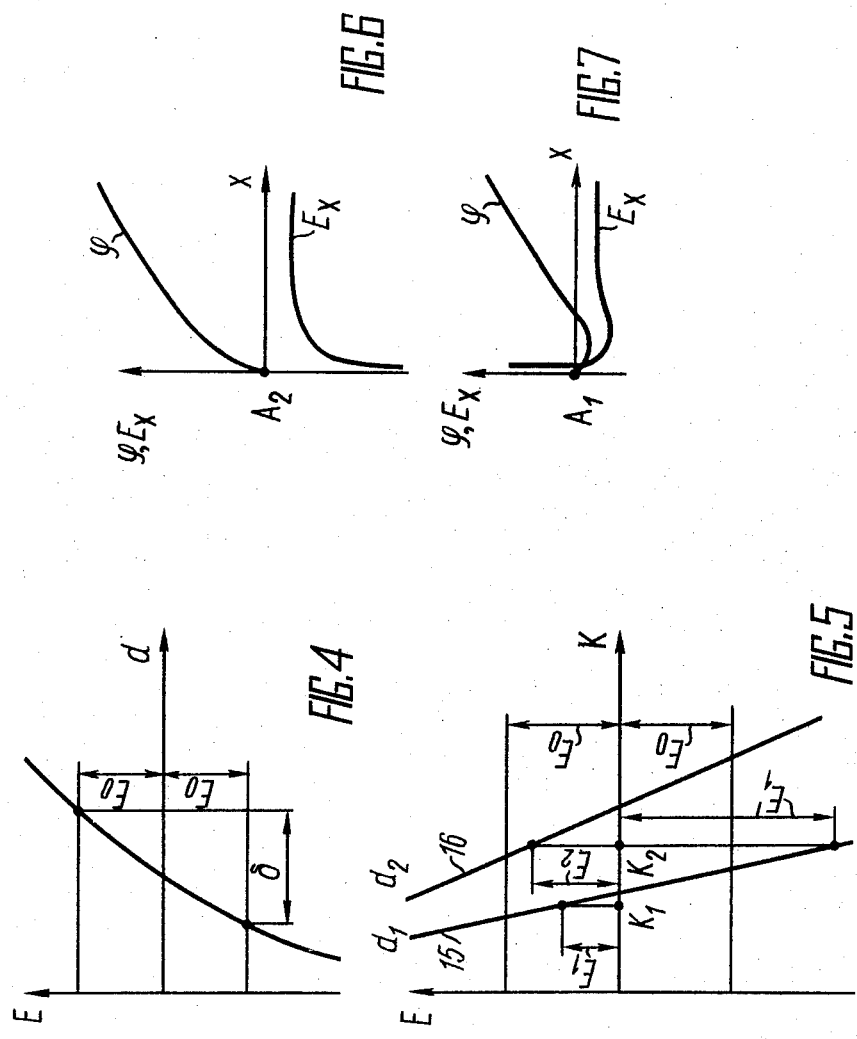

CHANNEL OF SERIES-TYPE MAGNETOHYDRODYNAMIC GENERATOR

FIELD OF THE INVENTION

The invention relates to magnetohydrodynamic (MHD) devices and, more particularly, to the channels of series-type MHD generators.

DESCRIPTION OF THE PRIOR ART

Known in the art is a channel of a series-type MHD generator, comprising a central section with sectionalized electrodes, end sections implemented as continuous load electrodes to which a load is connected, and transition sections implemented as sectionalized electrodes and located between the central section and the end sections.

The construction described above makes it possible to pick up large currents from the channel. However, there result large electric field strengths at the joints between the continuous electrodes and the sectionalized portion of the channel.

To reduce the electric field strengths at the joints, use is made of properly selected compensation resistors which are inserted between the sectionalized electrodes of the transition sections and the continuous load electrodes (cf. a paper by W. T. Norris and J. B. Heywood in the Proc. IEE, vol. 115, No. 4, April 1968, pp. 555-561).

Large electric field strengths can be produced, however, when the normal operation of the channel is disturbed.

There is a channel of an MHD generator in which the electric field strength is held automatically at a limited value along the entire sectionalized portion of the channel (cf. the U.S. Pat. No. 3,940,639 (1976).

The described construction utilizes switching elements with series-connected ballast resistors, which are inserted between each pair of adjacent electrodes so as to cancel overvoltages of the same sign as that of the channel working voltage. Though the construction uses a relatively sophisticated control circuit, there might result, in the zone of the joints between the continuous and the sectionalized electrodes, large field strengths having a sign opposite that of the channel working voltage. Moreover, some power loss place in compensating for the differences of the field strengths along the sectionalized portion of the channel.

There is also a channel of a series-type MHD generator, which comprises, unlike the construction described above, switching elements inserted each between a continuous load electrode and one of the electrodes of the transition section (cf. a paper by T. R. Brogan, A. M. Aframe and J. A. Hill, MHD Sixth Int. Conf., MHD El. Power Generation, pp. 267-285). There are measuring elements, namely, voltmeters, which are connected in parallel with the switching elements. The human operator exercises control over the switching elements from a control console so as to connect the desirable one of the sectionalized electrodes of the transition section to the load electrode of the end section. As a result, the joint, which is a boundary between the end and the transition portions, is shifted with respect to the magnetic system of the MHD generator, with the result that the electric field strength at the joint becomes equal to zero.

The described construction is disadvantageous in that no sequence of switching on the electrodes is established, which may cause a disturbance in the normal operation of the channel. In addition, a zero electric field strength at the joint requires that the electrodes in the transition section be sectionalized to a greater extent, which results in a sophisticated channel design and complex control functions. It is impossible to control and eliminate promptly the overvoltages occurred by using a manual control console.

As a result, breakdowns in the zone of the end section are possible, which causes unstable operation of the channel within a wide range of variation of the generator parameters, especially in cases when the latter are subject to rapid variation.

SUMMARY OF THE INVENTION

An object of the invention is to provide for a channel of a series-type MHD generator, which offers reliable operation with the generator parameters varying within a wide range due to the fact that the electric field strength within the channel is maintained in specified limits.

There is provided a channel of a series-type MHD generator, comprising a central section with sectionalized electrodes, the ends of said central section being made adjacent a chain of a transition section including sectionalized electrodes, and an end section made as a continuous load electrode. Switching elements are electrically connected to the electrodes of the end and transition sections, the switching elements each being connected, according to the invention, between each pair of adjacent electrodes. Relay-type limit voltage sensitive elements are each connected in parallel with a respective one of said switching elements. Respective relay-type limit voltage sensitive elements are inserted between the outermost adjacent electrodes of the transition sections and the central section. This actuating organs of the sensitive elements, connected in parallel with the switching elements between the load electrode and the outermost electrode of a respective transition section control the making of said corresponding switching elements only; the actuating organs of the sensitive elements inserted between the outermost adjacent electrodes of the transition sections and the central section to control the breaking of the switching elements inserted between the nearest pair of the electrodes; and, the actuating organs of the remaining sensitive elements control the making of the switching elements in parallel connection with them and control the breaking of the switching elements inserted between the nearest adjacent pair of the electrodes on the side of the load electrode.

Advantageously, the relay-type limit voltage sensitive elements should be voltage polarization relays and the switching elements should be automatic-return making retaining contacts.

The channel of the magnetohydrodynamic generator of the invention is characterized by an increased operational reliability, which is attained by automatically limiting the electric field strength within the zone of the joints to specified limits relating to both positive and negative values of the strength. No sophisticated control system is required. In addition, the sectionalization pitch of the electrodes is not subject to specific limitations. Finally, arcing is not likely to occur.

BRIEF DESCRIPTION OF THE DRAWINGS

The invention will now be described in more detail with reference to the accompanying drawings in which:

FIG. 4 is a graph relationship between the electric field strength at the joint and the position thereof within the magnetic field of the channel, according to the invention;

FIG. 5 is a graph relationship between the electric field strength at the joint and the load coefficient for different positions of the joint, according to the invention;

FIG. 6 is a graph showing the distribution of the electric field strength and the potential along the channel length in the case when the joint is located within a magnetic field of a high induction;

FIG. 7 is a graph showing the distribution of the electric field strength and the potential along the channel length in the case when the joint is located within a zone of an attenuated magnetic field of a low induction.

DETAILED DESCRIPTION OF THE INVENTION

Figure 1:
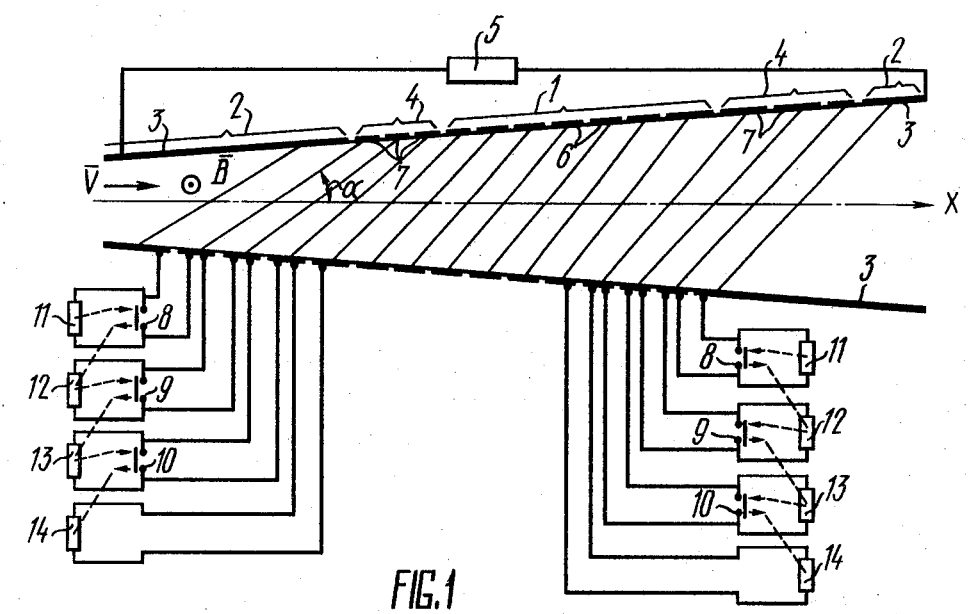
FIG. 1 is a circuit diagram of a channel of a series-type magnetohydrodynamic generator, according to the invention.

The channel of the series-type MHD generator comprises, according to the invention, a central section 1 (FIG. 1), two end sections 2 each including a continuous load electrode 3, and two transition sections 4 each located between the central section 1 and a corresponding end section 2. A load 5 is inserted between the load electrodes 3. The central section 1 includes sectionalized electrodes 6 and the transition sections 4 include sectionalized electrodes 7. Switching elements 8 are connected between the load electrodes 3 and the outermost electrodes 7 of the transition sections 4, adjoining the electrodes 3. Switching elements 9 and 10 are inserted between adjacent electrodes 7 of the transition sections 4. Relay-type limit voltage sensitive elements 11, 12 and 13 are connected in parallel with the switching elements 8, 9, 10. In addition, relay-type limit voltage sensitive elements 13 are inserted between outermost adjacent electrodes 6 and 7 belonging respectively to the central section 1 and corresponding transition sections 4. The sensitive elements 11 inserted between the load electrodes 3 and their adjoining sectionalized electrodes 7 utilize their actuating organs of direct or indirect action to control only those switching elements 8 which are connected between the same pairs of the electrodes 3 and 7. The sensitive elements 14 are adapted to control the switching elements 10 which are connected to adjacent pairs of the electrodes 7 on the side of the load electrodes 3. There are dashed lines in FIG. 1 to show control couplings. Each of the sensitive elements 12 and 13, for example, that labelled by reference numeral 13 and connected to the electrodes 7 of the transition sections 4, is adapted to exercise control over either the switching elements 10 connected to the same electrodes 7 are over the switching elements 9 connected to adjacent pairs of the electrodes 7 on the side of the load electrodes 3.

Figure 2:
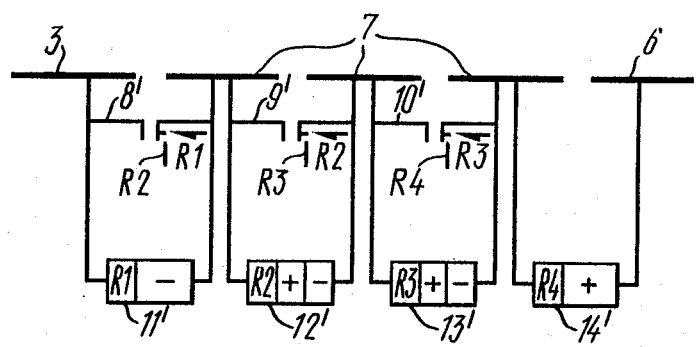
FIG. 2 shows electrodes of end and transition sections and an outermost electrode of a central section with polarization relays and switching elements connected to them, according to the invention.

One of the simplest embodiments of the circuit diagram of the channel of the MHD generator, according to the invention, utilizes polarization relays 11′ (FIG. 2), 12′ and 13′, 14′ for the limit voltage sensitive elements, and making retaining contacts 8′, 9′ and 10′ with automatic electromagnetic return for the switching elements. The actuating organ of the relay 14′ is used to control merely the braking of the contact 10′. The actuating organ of the relay 11′ operates to control the making of the contact 8′. The actuating organ of the relay 12′ operates to control the making of the contact 9′ and the breaking of the contact 8′, and the actuating organ of the relay 13′ is adapted to control the making of the contact 10′ and the breaking of the contact 9′.

Figure 3:
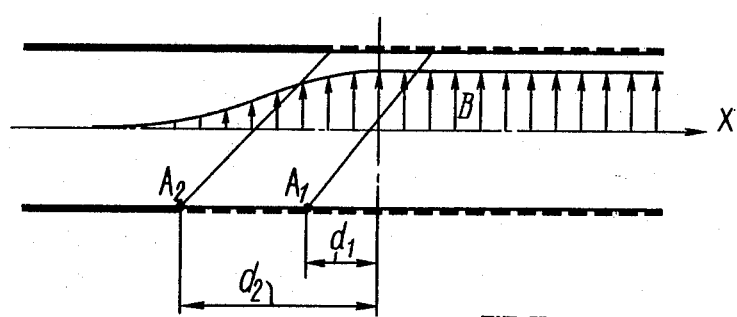
FIG. 3 is a diagrammatic representation of the end section together with adjoining portion of the transition section of the channel as well as a chart to show a distribution of the induction along the lengths of these sections, according to the invention.

The electric field strength in the channel of the series-type MHD generator of the invention is held within specified limits due to the fact that its value and sign, as related to the joint between the load electrode 3 (FIG. 1) and its adjoining electrode 7 of the transition section 4, depend on the position of the joint within the magnetic field of the channel, on the mode of operation of the channel, and on the commutation angle, $\alpha$, of the electrodes 7 of the transition section 4. According to FIG. 3, point $A_1$ determines that position of the joint for which all the switching elements are held in make state. There is a boundary at which induction B begins to drop, shown as a thin vertical line in FIG. 3, with distance $d_1$ separating that boundary from point $A_1$. Point $A_2$ determines that position of the joint for which all the switching elements are held in break state, distance $d_2$ separating the above boundary from point $A_2$.

FIG. 4 illustrates a dependence of the electric field strength, E, at a given mode of operation of the channel, on the position of the joint (distance d), which position being determined by a sequential making of the switching elements. According to FIG. 4, there exists a zone of width $\delta$ including different joint positions. In this zone, the absolute value of strength E at the joint does not exceed the permissible values of strength $E_O$. FIG. 5 illustrates a dependence of strength E at the joint on load coefficient K, which is characteristic of the mode of operation of the channel. In FIG. 5, line 15 stands for the position of the joint at point $A_1$ (distance $d_1$), and line 16 stands for the position of the joint at point $A_2$ (distance $d_2$). If the absolute value of field strength $E_1$ is less than a permissible value of $E_O$, case when the channel mode is characterized by load coefficient $K_1$, a new value of field strength at the joint, $E_1'$, corresponding to a load coefficient $K_2$, exceeds the value of $E_O$. When the position of the joint is transferred from point $A_1$ (line 15) to point $A_2$ (line 16), the field strength at the joint drops down to a value of $E_2$, which is less than $E_O$. Flatter curves representing a dependence of E on K give greater operational reliability and more simple control of the channel. Most favourable control conditions are attained with channels whose electrodes 7 of the transition section 4 have commutation angle $\alpha$ (FIG. 1), which tends to decrease towards the load electrode 3. The associated calculations have been accomplished to determine the required channel parameters. With the joint located in a zone of a magnetic field having higher values of induction B, for example, a position given by point $A_1$ in FIG. 3, electric field strength $E_x$ is distributed along the channel wall, beginning at point $A_1$, as shown in FIG. 6. On the other hand, FIG. 7 shows a distribution of electric field strength $E_x$ along the channel wall, beginning at point $A_2$, when the joint is positioned within a zone of a magnetic field with lower values of induction B. The analysis of data given by FIGS. 6 and 7 shows that large overvoltages might occur across the joint and that field strength $E_x$ might change its sign. FIGS. 6 and 7 also illustrate how potential $\tau$ across the channel wall changes its distribution characteristic. Note that the potential difference between the electrodes forming the joint can be given a sign corresponding to or opposite that of the rhe channel voltage.

The channel of the series-type MHD generator of the invention operates in the following manner. According to previously made calculations, the channel is adjusted with respect to a magnet (not shown) in a manner that no impermissible voltage having the same sign as the channel working voltage is allowed to be produced across the joints even in most unfavourable conditions. If the joint assumes a position at which an impermissible voltage of opposite sign occurs across it, the sensitive element 11 (FIG. 1) causes the making of the switching element 8 and a short circuit condition occurs, including the load electrode 3 and its adjoining electrode 7 of the transition section 4. This provides for extra strength of the load electrode 3 and a point when it joins the sectionalized electrode 7 is transferred to the channel center, with the result that the joint voltage is decreased. If, even with this position of the joint, an impermissible voltage of opposite sign is produced, the sensitive element 12 causes the making of the switching element 9, thereby resulting in further shifting of the joint towards the channel center. The described events may occur until all the electrodes 7 of the transition section 4 are shorted. The boundary between the transition and central sections 1 and 4 should be selected by calculation so that no impermissible voltage of opposite sign is allowed to appear across the joint at that boundary even in most unfavourable conditions. As a result, no further shifting of the joint towards the channel center is required in this case. The voltage across the joint in this limit position is checked by the sensitive element 14. With the joint in the above position, when there is an appearance of an impermissible voltage of the same sign as that of the channel voltage, the sensitive element 14 operates to break the switching element 10, with the result that the joint is transferred towards the load electrode 3. The events described may occur until the point in time when the switching element 8 breaks and the joint is therefore assumes its initial position.

Thus, the sensitive elements 11–14 are adapted to control the switching elements 8–10 so that the electrodes 7 of the transition section 4, on the side of the central section 1 of the channel, are opened when direct voltage exceeds the permissible level ($E_O$) and no current overload takes place. In addition, automatic shorting of the electrodes 3 and 7 according to the signals generated by the sensitive elements 11–14 when the permissible level of reverse voltage is exceeded eliminates electric breakdown of the electrodes. The analysis of electric damage to pilot MHD generators shows that almost all causes are concerned with current overload and interelectrode breakdown. In the channel of the series-type MHD generator of the invention the maximum power of the generator is maintained automatically, an important feature unavailable in the known competitors.

What is claimed is:

1. A channel of a series-type magnetohydrodynamic generator comprising: a central section; a plurality of sectionalized electrodes included in said central section; two transition sections each adjoining respective ends of said central section; another plurality of sectionalized electrodes included in said transition sections; two end sections each adjoining other ends of respective transition sections, each of said end sections including a continuous load electrode; a plurality of switching elements, each being inserted between adjacent electrodes of said end and transition portions; a plurality of relay-type limit voltage sensitive elements, each being connected in parallel with a respective switching elements, sensitive elements of the same type being inserted respectively between outermost adjacent electrodes of said central and transition sections; actuating organs of said sensitive elements, the actuating organs of some of said sensitive elements, being connected in parallel with said switching elements between load electrodes and an outermost electrode of a respective transition section to control the making of said switching elements only, the actuating organs of some of said sensitive elements being inserted between outermost adjacent electrodes of said central and transition sections to control the breaking of said switching elements inserted between the nearest adjacent pair of said electrodes, and the actuating organs of remaining sensitive elements being connected in parallel with said electrodes of said transition sections to control the making of the switching elements to which they are connected in parallel and to control the breaking of switching elements inserted between the nearest adjacent pairs of said electrodes on the side of said load electrode.

2. A channel of a series-type magnetohydrodynamic generator as claimed in claim 1, wherein said sensitive elements include voltage polarization relays and said switching elements include automatic-return making retaining contacts.

* * * * *